(12) United States Patent
Studenkov et al.

(10) Patent No.: US 8,494,314 B2
(45) Date of Patent: Jul. 23, 2013

(54) FABRICATION TOLERANT POLARIZATION CONVERTER

(75) Inventors: Pavel V. Studenkov, Cupertino, CA (US); Vikrant Lal, Sunnyvale, CA (US); Scott Corzine, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 258 days.

(21) Appl. No.: 12/830,435

(22) Filed: Jul. 5, 2010

(65) Prior Publication Data

US 2012/0002912 A1 Jan. 5, 2012

(51) Int. Cl.
*G02B 6/00* (2006.01)
(52) U.S. Cl.
USPC .......................................................... 385/11
(58) Field of Classification Search
None
See application file for complete search history.

(56) References Cited

U.S. PATENT DOCUMENTS

| | | | | |
|---|---|---|---|---|
| 5,506,722 | A * | 4/1996 | Mizuuchi et al. | 359/332 |
| 5,737,352 | A * | 4/1998 | Tiemeijer et al. | 372/50.22 |
| 6,603,599 | B1 * | 8/2003 | Wang et al. | 359/344 |
| 7,792,403 | B1 * | 9/2010 | Little et al. | 385/43 |
| 2005/0254128 | A1 * | 11/2005 | Watts | 359/558 |
| 2006/0018584 | A1 * | 1/2006 | Watts et al. | 385/11 |

* cited by examiner

*Primary Examiner* — Sung Pak
(74) *Attorney, Agent, or Firm* — Ross M. Carothers; David L. Soltz

(57) ABSTRACT

The present invention provides a polarization converter, and a method for fabricating the same. The polarization converter includes a geometric shape which induces rotation of a polarization of an optical signal from a first polarization state to a second polarization state as the optical signal propagates along the polarization converter. The performance of the polarization converter is maintained in light of inconsistencies in fabrication processes resulting in improved manufacturability.

21 Claims, 8 Drawing Sheets

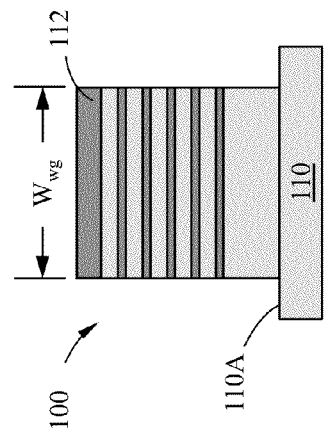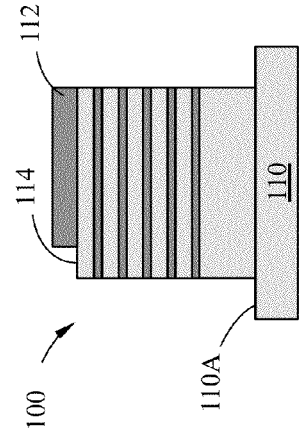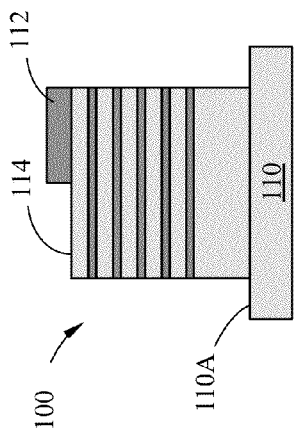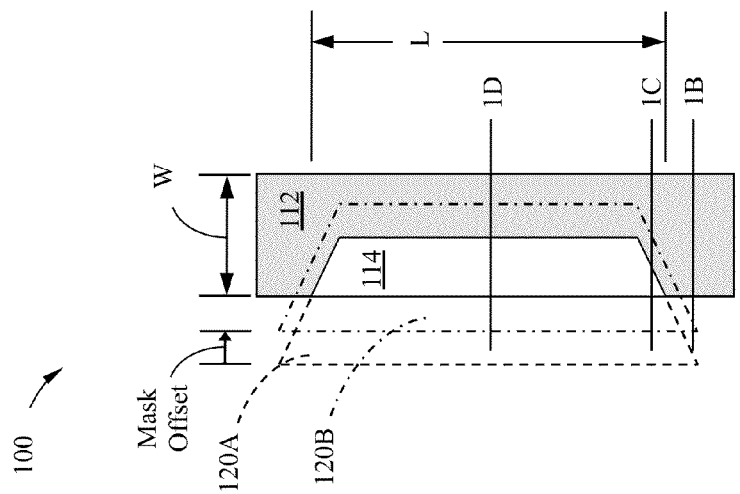

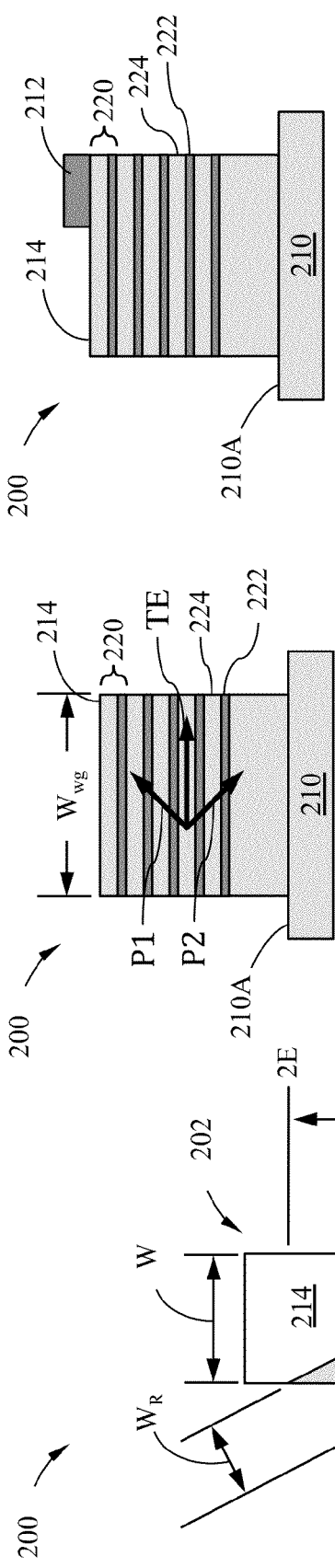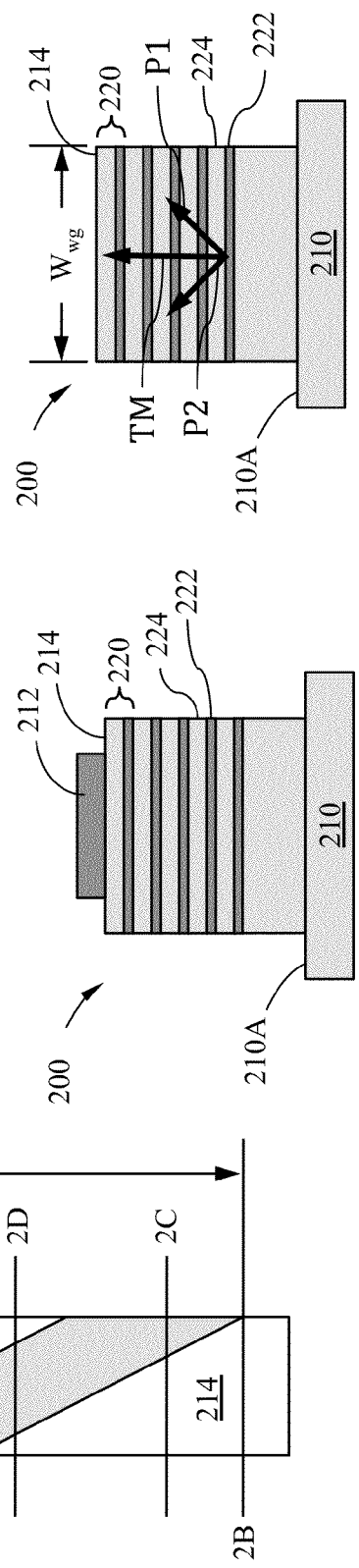

FABRICATION TOLERANT POLARIZATION CONVERTER

BACKGROUND OF THE INVENTION

1. Field of the Invention

This invention relates generally to optical transmission systems and, more particularly, to polarization converters utilized in such optical transmission systems.

2. Description of the Related Art

Polarization rotators are building block elements in photonic integrated circuits (PICs). A polarization converter may be configured to accept an optical signal having a first polarization state at an input and convert the first polarization state into a second polarization state at an output. The first and second polarization states may be orthogonal. For example, the first polarization state may be a transverse electric (TE) polarization state and the second polarization state may be a transverse magnetic (TM) polarization state, the polarization converter converting the polarization state of the optical signal from the TE polarization state to the TM polarization state. Polarization converters are widely used in polarization diverse optical circuits, for example an optical circuit may be configured to accept optical signals of multiple polarization states, however process optical signals only with respect to one polarization state. A polarization converter, as part of the optical circuit for example, may then be used to convert the TM polarization state component of the optical signal into a TE polarization state component prior to processing. Such conversion of the polarization state affords the optical circuit designer the ability to use similar circuit elements, for example with similar designs, in the processing of the optical signal. After processing of the optical signal, one of the signals may be converted into an orthogonal polarization state by a second polarization rotator and then combined into a single output by a polarization beam combiner.

Polarization converters or rotators typically require precise geometry and tight control of critical dimensions of the rotator during fabrication. Turning to FIG. 1A, a waveguide 100 is fabricated into a polarization rotator. The waveguide 100 is typically fabricated by first providing various layers of semiconductor materials atop a top surface 110A of a substrate 110, and then etching back a top layer 112 to expose a notch 114, as shown in FIGS. 1B-1D for example. In one exemplary process, an etch mask 120A, shown in dashed line, is provided atop of the top layer 112, the etch mask 120A defining that area which will be etched or removed from the waveguide 100 structure to create the polarization rotator. The top layer 112 is then etched back a portion of the waveguide 100 width W to create the recessed portion or notch 114 giving the waveguide 100 an asymmetrical geometry along a longitudinal axis of the waveguide 100. FIGS. 1B-1D represent cross section views of the waveguide 100 at lines 1B, 1C and 1D, respectively. The cross section views as depicted in FIGS. 1B-1D are similar except for that portion of the top layer 112 which has been removed in an etching process. For example, with respect to FIG. 1B, at line 1B of FIG. 1A the width of the top layer 112 equals the width W of the waveguide 100 itself. FIG. 1C depicts the cross section at line 1C of FIG. 1A. As shown in FIG. 1C, in accordance with the etch mask 120A a portion of the top layer 112 has been removed to form the notch 114. FIG. 1D depicts the cross section at line 1D of FIG. 1A, the top layer 112 having a width of a about half the width W of the waveguide 100 forming notch 114.

Proper placement of the etch mask 120A is needed to provide the necessary asymmetric nature of the waveguide 100 in order to achieve the desired polarization rotation of an optical signal or electromagnetic wave propagating through the waveguide 100 along its length L. Waveguides are typically on the order of a few micrometers width and the ability to properly place the etch mask may be limited by corresponding stepper motors which move or otherwise position the etch mask upon the waveguide 100. For example, if the etch mask is laterally misaligned a distance, labeled Mask Offset, as compared to the desired position of the etch mask 120A, such as etch mask 120B shown in dash-dot line, the asymmetrical nature of the waveguide 100 is disturbed. Such misalignment of the etch mask 120B may result in undesirable results of the corresponding polarization rotator.

There is a need to develop a polarization rotator or converter, and corresponding processes, which are tolerant to lateral offsets of an etch mask, or equivalent structure, during fabrication.

SUMMARY OF THE INVENTION

The present invention provides a polarization converter tolerant to lateral offsets of an etch mask, or similar structure, and a method for fabricating the same. The polarization converter includes a geometric shape which induces rotation of a polarization of an optical signal from a first polarization state to a second polarization state as the optical signal propagates along the polarization converter. The performance of the polarization converter of the present invention is maintained in light of inconsistencies in the fabrication processes, resulting in improved manufacturability. According to various embodiments of the invention, a polarization converter is fabricated from a waveguide having first and second semiconductor layers. In one aspect of the invention the first and second semiconductor layers form first and second levels of the waveguide. The second semiconductor layer may be a raised portion with respect to the first semiconductor layer. Alternatively, the second semiconductor layer may be a recessed portion with respect to the first semiconductor layer. The second semiconductor layer may include first and second sides each extending from a first side of the first semiconductor layer to a second side of the first semiconductor layer. According to certain aspects of the invention, a first distance extending perpendicularly from the first side of the first semiconductor layer to the first side of the second semiconductor layer increases along a first portion of a length of the first semiconductor layer. According to still other aspects of the invention, a second distance extending perpendicularly from the first side of the first semiconductor layer to the second side of the second semiconductor layer increases along a second portion of the length of the first semiconductor layer. In yet other aspects of the invention, the waveguide includes an input and an output, the input being configured to receive light. The waveguide is configured to induce rotation of a polarization of the light from a first polarization state to a second polarization state as the light propagates along the length of the first semiconductor layer. Consistent with further aspects of the invention, lateral offsets of etching masks used in fabrication of the waveguide to form raised or recessed structures result in translation of the structures along a lateral or longitudinal axis of the waveguide, substantially maintaining the integrity of the raised or recessed structures with respect to the waveguide, and preserving the performance of the polarization converter.

It is to be understood that both the foregoing general description and the following detailed description are exemplary and explanatory only and are not restrictive of the invention, as claimed. Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. In the drawings wherein like reference symbols refer to like parts:

FIG. 1A depicts a planar view of a typical exemplary polarization rotator;

FIG. 1B depicts a first cross section view at a first point along a length of the exemplary polarization rotator of FIG. 1A;

FIG. 1C depicts a second cross section view at a second point along the length of the exemplary polarization rotator of FIG. 1A;

FIG. 1D depicts a third cross section view at a third point along the length of the exemplary polarization rotator of FIG. 1A;

FIG. 2A depicts a polarization rotator, in accordance with various aspects of the present disclosure;

FIG. 2B depicts a first cross section view at a first point along a length of the embodiment of FIG. 2A;

FIG. 2C depicts a second cross section view at a second point along the length of the embodiment of FIG. 2A;

FIG. 2D depicts a third cross section view at a third point along the length of the embodiment of FIG. 2A;

FIG. 2E depicts a cross-sectional view taken along line 2E of FIG. 2A;

DETAILED DESCRIPTION OF THE INVENTION

Figures 3A, 3B, 3C:
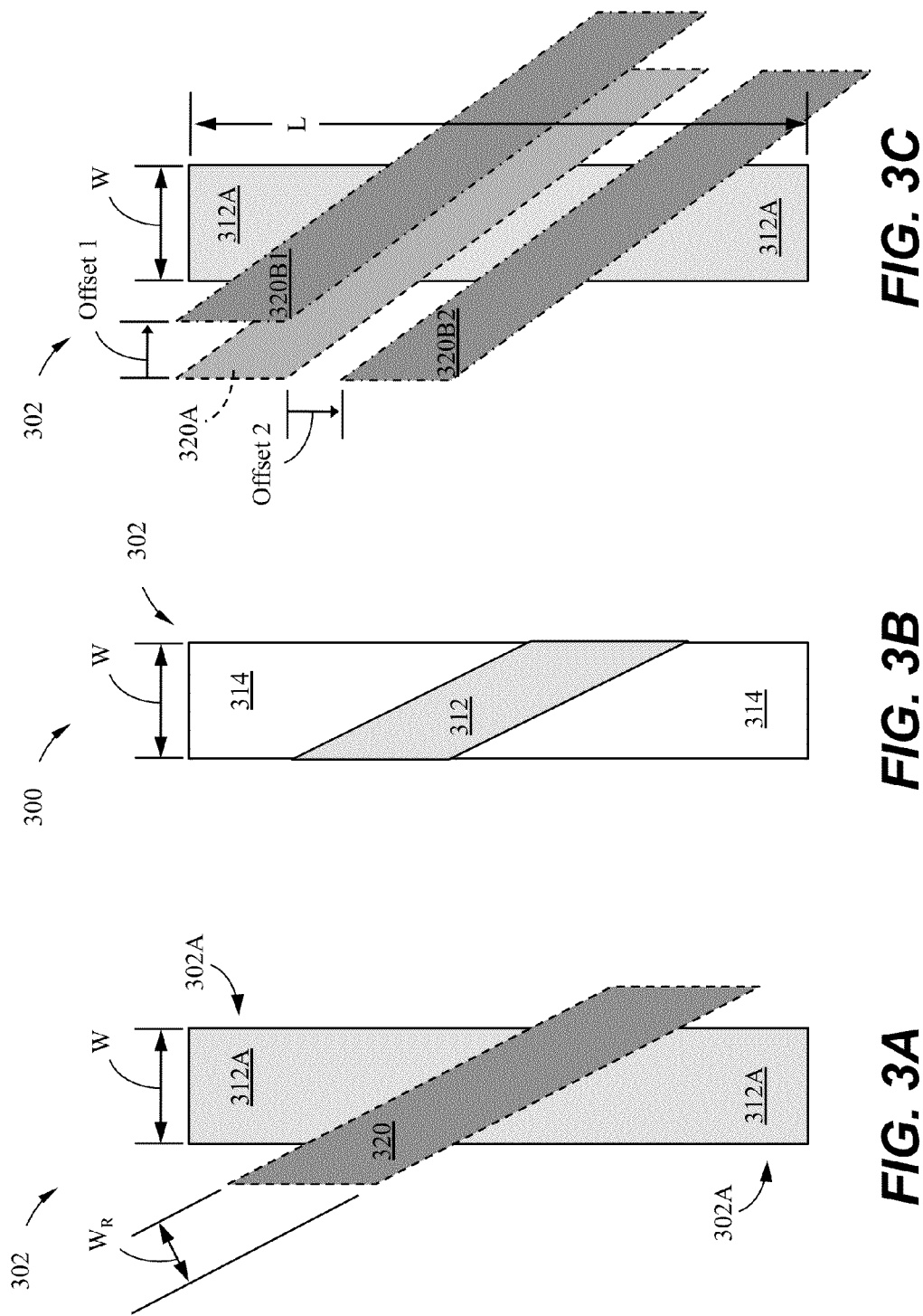
FIG. 3A depicts a planar view of a waveguide with an image of a patterned opening for the fabrication of a polarization rotator, in accordance with various aspects of the present disclosure.
FIG. 3B depicts a planar view of a polarization rotator, in accordance with various aspects of the present disclosure.
FIG. 3C depicts a planar view of a waveguide and potential placement offsets of a patterned opening for the fabrication of a polarization rotator, in accordance with various aspects of the present disclosure.

The present invention provides a polarization converter, and a method for fabricating the same. The polarization converter includes a geometric shape which induces rotation of a polarization of an optical signal from a first polarization state to a second polarization state as the optical signal propagates along the polarization converter. The performance of the polarization converter is maintained in light of inconsistencies in fabrication processes resulting in improved manufacturability.

The following description is set forth for purpose of explanation in order to provide an understanding of the invention. However, it is apparent that one skilled in the art will recognize that embodiments of the present invention, some of which are described below, may be incorporated into a number of different systems and devices.

The embodiments of the present invention may include certain aspects each of which may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, signals, whether optical or electrical, between these components may be modified, re-formatted or otherwise changed by intermediary components.

Reference will now be made in detail to the present exemplary embodiments, which are illustrated in the accompanying drawings.

A polarization rotator or converter may be a waveplate which induces a 90° polarization rotation, often termed a "half-waveplate". An exemplary polarization rotator 200, in accordance with various aspects of the present invention, is depicted in FIG. 2A. The asymmetrical nature of the polarization rotator 200 along its length L converts a TE incident field into a TM field. Turning to FIG. 2B which depicts the cross section of the polarization rotator 200 at a line 1B of FIG. 2A, the rotator 200 is depicted as birefringent material provided on a top surface 210A of a substrate 210, the birefringent material having principle axes along directions P1 and P2 for example. An incident TE field has a horizontal polarization state, e.g. represented by arrow TE which is parallel to the surface 210A of the substrate 210. The principle axes P1 and P2 are aligned exactly at 45° with respect to the TE incident field. The waveplate eigenmodes are also oriented along P1 and P2. Because of the 45° orientation of the principle axes P1 and P2 with respect to the TE incident field, the TE incident field excites equal proportions of both waveplate-eigenmodes. The rotator 200 eigenmodes have propagation constants of B1 and B2, where by definition B1>B2. As the waveplate-eigenmodes propagate through the rotator 200 at different phase velocities, they accumulate a relative phase shift. At the output of the rotator of length Ls, as depicted in FIG. 2E corresponding to the cross section view at line 2E of FIG. 2A, the relative phase shift is Ls*(B1−B2). The rotator 200 may be designed to have a length $L_S$ such that there is a relative phase shift of π, or mathematically Ls*(B1−B2)=π. Since phase is periodic, in general the phase may be also represented by π+2π*N, where N is an integer. Under this phase accumulation condition, the direction of the polarization for one of the waveplate eigenmodes changes signs relative to the other, in this case vector P2. Summing the output vectors P1 and P2 of FIG. 2E, the net output direction has changed by 90°. Thus, a TE polarization of an optical signal entering the rotator 200 at line 2B of FIG. 2A is converted or rotated into a TM polarization of the optical signal at the output of the rotator 200 at line 2E FIG. 2A. The two principle eigenstates of PIC waveguides are TE and TM, where for TE the electric field is oriented in the plane of the substrate, while for TM the electric field is oriented perpendicular to the substrate. In a rotator, such as rotator 200 for example, the rotation may be induced by fabrication approaches which create an asymmetry in the otherwise rectangular waveguides.

The rotator 200 includes a raised portion 212 which is raised with respect to portion 214, for example through an etching process during fabrication. As shown, the width $W_R$ of the raised portion 212 may be constant along the length L of the rotator 200. Turning to FIG. 2B, the waveguide 202 structure of the rotator 200 is fabricated by providing alternating layers 220 upon a top surface 210A of a substrate 210. The alternating layers 220 may include a first material 222 having a first index and a second material 224 having a second index. Initially, a high index material is provided on top of the last of the layers 220, the high index material being etched during fabrication to provide the raised portion 212 for example. With referenced to FIG. 2C, a cross section at line 2C of FIG. 2A is depicted. At line 2C of FIG. 2A, the raised portion 212 is partially visible. With reference to FIG. 2D depicting the cross section at line 2D of FIG. 2A, the raised portion 212 takes up a greater portion of the width W of the waveguide 202. Finally, with reference to FIG. 2E, the high index material has been etched leaving the notch 114 which is lower than the raised portion 212.

Whether the asymmetry is created by a notched portion, such as notch 114 of rotator 100, or a raised portion, such as raised portion 212 of rotator 200, the principles of the present invention disclosed herein still apply. Unlike the notch 114 of the rotator 100 which only partially laterally extends into the waveguide 102, the raised portion 212 of rotator 200, as compared to the etched portion 214, extends completely across the waveguide in the shape of a "slash".

With reference to FIGS. 3A-3C, the fabrication of a polarization rotator 300, having a slash similar to the polarization rotator 200, will be described in greater detail. A waveguide 302 of width W is first fabricated, for example by providing multiple alternating layers of low index and high index materials as described above with respect to FIGS. 2B-2E. For example, the substrate and lower index layers may be InP with an index of 3.13 at a wavelength of 1550 nm, while the high index material may be an InP alloy such as InGaAsP. Depending on the InP alloy the high index can vary. A typical high index value may be 3.30. A last high index material 312A is provided on top of the last of the multiple alternating layers. For illustration purposes only, each of the first and second semiconductor layers may be constructed of a material selected from a group consisting of silicon, silicon nitride, silicon oxynitride, silicon oxycarbide, germanium doped silica, indium phosphide, gallium arsenide, high index polymers, and combinations thereof.

An etch mask 320 is then positioned over the material 312A, the inner volume of the etch mask 320 defining an area which will remain after an etching process. The etch mask 320 may extend past the sides of the waveguide 302, as depicted. Light guided in the waveguide 302 does not extend much beyond the waveguide 302 sidewalls 302A, and so, etching features that extend beyond the waveguide boundary have little effect on an optical signal propagating in the waveguide. The remainder of the material 312A, e.g. the material not directly under the etch mask 320, is then removed in an etching process to provide the polarization rotator 300 of FIG. 3B, the rotator 300 including a raised portion 312 and a recessed portion 314.

As depicted in FIG. 3C, the process described herein is tolerant of misaligned placement of an etch mask 320A along the width W and length L of the waveguide 302. For example, if the etch mask 320A were positioned as shown by an etch mask 320B1, laterally offset a distance of Offset 1 in a first direction from the etch mask 320A, the geometric characteristics of the resulting raised portion 312 would remain similar to the raised portion 312 of rotator 300 of FIG. 3B. Similarly, if the etch mask 320A were positioned as shown by an etch mask 320B2, longitudinally offset a distance of Offset 2 in a second direction from the etch mask 320A, still the geometric characteristics of the resulting raised portion 312 would remain similar to the raised portion 312 of rotator 300 of FIG. 3B. In both of the examples above, compared with the target mask position of mask 320A, the rotator geometry as seen by the waveguide 302 is preserved, only laterally or longitudinally moved along the waveguide 302. Since the shape of the rotator slash is preserved, e.g. the resultant geometric shape of the raised portion 312 as shown in FIG. 3B, so is the rotator 300 performance.

Referring to FIGS. 4A-4G, a simulation of an exemplary polarization rotator designed and fabricated consistent with the present disclosure is depicted. As described above with respect to polarization rotator 300 of FIG. 3B, polarization rotator 400 is fabricated along a portion of a waveguide 402 to define a raised portion 412 and a recessed portion 414. Together, the raised portion 412 and the recessed portion 414 cooperate to provide polarization rotation of a polarization mode associated with an optical signal propagating through the rotator 400. In order to achieve proper rotation of the polarization mode the slash or raised portion 412 of the polarization rotator 400 must have geometric characteristics to encourage such rotation, e.g. the width $W_R$ and the length $L_R$ of the raised portion 412. As mentioned above, while the polarization rotator 400 is described with respect to having a raised portion 412 with respect to the recessed portion 414, the portion 412 may be recessed with respect to portion 414 and the same result will be achieved, e.g. polarization of a polarization mode associated with an optical signal propagating through the rotator 400. The parameters $W_S$ and $L_S$ may be determined through numerical simulations to give the optimum performance. For instance, the width $W_S$ may be fixed at a first value, and then the length $L_S$ may be adjusted until optimum polarization conversion is achieved.

Figures 4A, 4B, 4C:
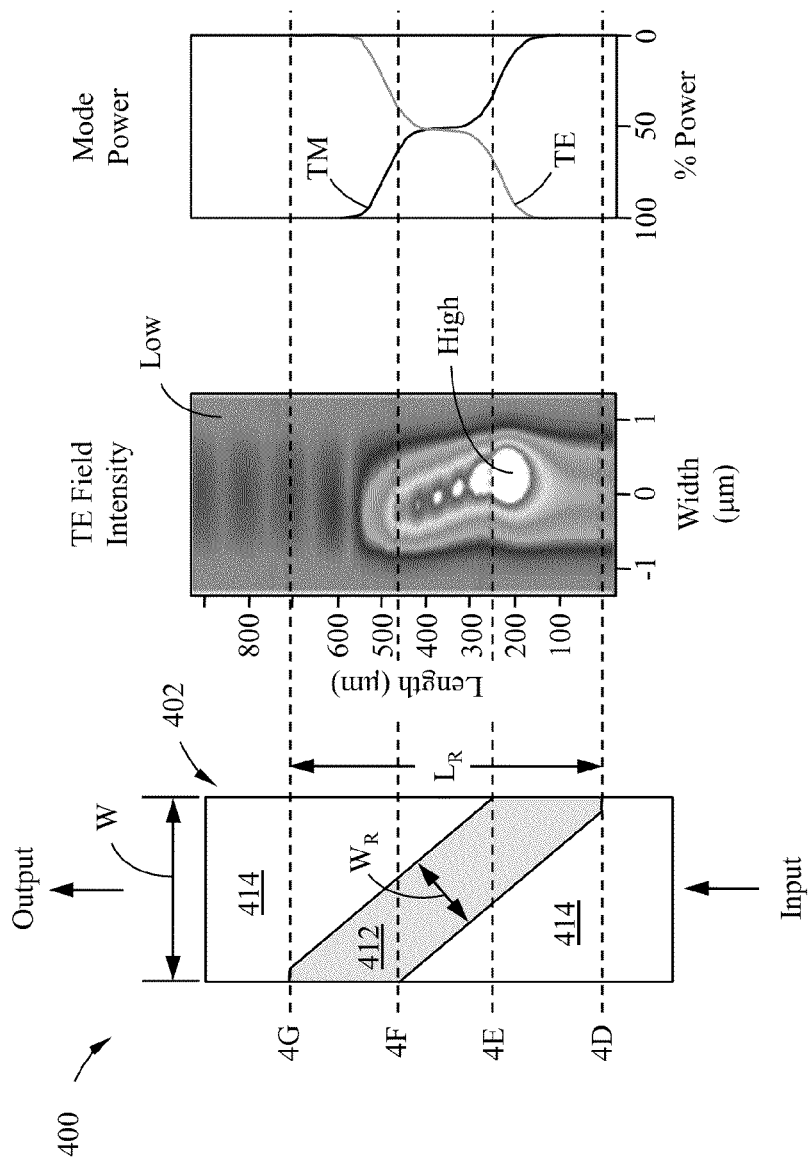
FIG. 4A depicts an exemplary embodiment of a polarization rotator, in accordance with various aspects of the present disclosure.
FIG. 4B depicts a field intensity simulation of the response of the polarization rotator of FIG. 4A.
FIG. 4C depicts a mode power simulation of the response of the polarization rotator of FIG. 4A.
Figure 4D:
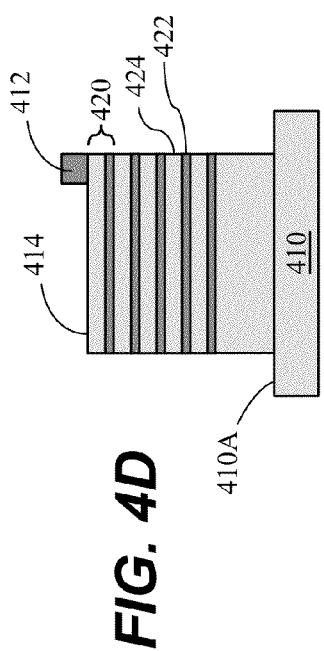
FIG. 4D depicts a first cross section view at a first point along a length of the polarization rotator of FIG. 4A.
Figure 4F:
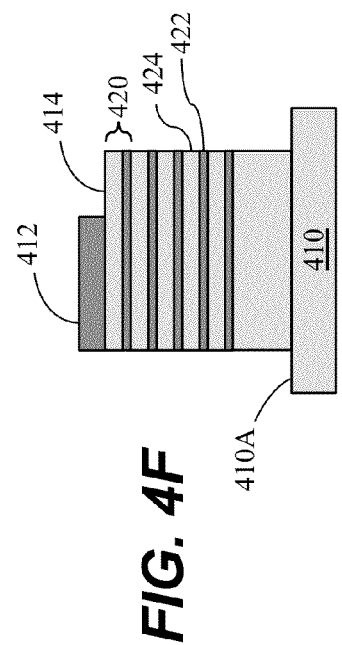
FIG. 4F depicts a third cross section view at a third point along the length of the polarization rotator of FIG. 4A.
Figure 4E:
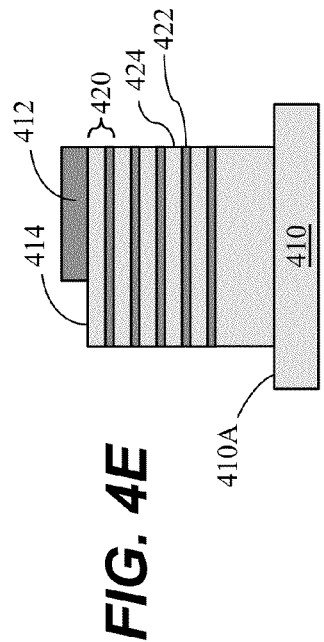
FIG. 4E depicts a second cross section view at a second point along the length of the polarization rotator of FIG. 4A.
Figure 4G:
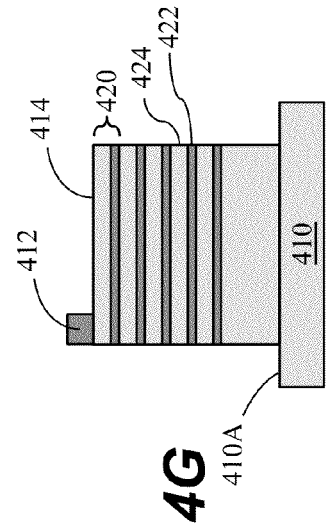
FIG. 4G depicts a fourth cross section view at a fourth point along the length of the polarization rotator of FIG. 4A.

FIGS. 4B and 4C depict a simulation of the TE field intensity, and TE and TM mode power, along the length LR of the rotator 400 of FIG. 4A, respectively. The width W of the waveguide 402 may be selected to be 1.8 μm, while the raised portion 412 may be configured during fabrication to have a width $W_R$ of about 1 μm and a length $L_R$ of about 710 μm. For this example, various waveguide cross sections at lines 4D-4G of FIG. 4A are depicted in FIGS. 4D-4G, respectively. During simulation, an optical signal having a TE mode is provided to the rotator 400 at an input, while the power in both the TE and TM polarization states is monitored along the length $L_R$ of the rotator 400. As the optical signal propagates from the input to an output of the rotator 400, the TE field intensity along the length of the rotator 400 as depicted in FIG. 4B transitions from a high intensity to a low intensity, confirming rotation of the polarization mode. The width of the TE field intensity graph is oriented such that a value of width=0 is aligned with a longitudinal axis of the rotator 400. Each adjacent shaded region of FIG. 4B between a first shaded region of high intensity to a second shaded region of low intensity, represents a step increment in declining intensity of the TE field. Referring to FIG. 4C, the mode power along the length of the rotator 400 is depicted. For example, at the input of the rotator 400 the TE mode power, as measured parallel to the substrate and near the top of the waveguide 402 for example, of the propagating optical signal is about 100%, and decreases to about 0% at the output of the rotator 400. Alternatively, the TM mode power of the propagating optical signal is about 0% at the input to the rotator 400 and increases to about 100% at the output of the rotator 400. Consistent with FIGS. 4B and 4C, polarization rotation is occurring over the length $L_R$ of the rotator 400. At the output of the rotator 400 at length $L_R$, almost all the power in the TE mode has been converted into the TM mode.

With reference to FIGS. 5A-5F, another exemplary polarization rotator 500 and corresponding simulation will be discussed in greater detail. Polarization rotator 500 includes a raised portion 512 and a recessed portion 514, fabricated consistent with the present disclosure for example. The slash or raised portion 512 has a width WS and a first length $L_{R1}$ corresponding to a first transition portion at an input to the rotator 500, a second length $L_{R2}$ corresponding to a middle portion, and a third length $L_{R3}$ corresponding to a second transition portion at an output to the rotator 500. As depicted, the width $W_R$ of the slash or raised portion 512 is greater than a width W of a waveguide 502. Since the portion of the rotator 500 along the length $L_{R2}$ is symmetrical with a longitudinal axis of the rotator 500, e.g. the raised portion 512 along length $L_{R2}$ extends the complete width W of the waveguide 502, the rotation of the polarization mode of an optical signal primarily occurs in the transition portions along lengths $L_{R1}$ and $L_{R3}$. As depicted, the raised portion 512 along length $L_{R1}$ may be symmetrical with the raised portion 512 along length $L_{R3}$. Alternatively, the raised portion 512 along lengths $L_{R1}$ and $L_{R3}$ may be adjusted independently to achieve optimum polarization conversion, the length $L_{R1}$ may be maintained at a know value and the length $L_{R3}$ may be adjusted relative to the length $L_{R1}$ to achieve optimum performance of the rotator 500. As stated earlier, while the rotator 500 is described as having a raised portion 512 relative to a recessed portion 514, the portion 512 may be recessed with respect to portion 514 without changing the performance of the rotator 500.

Figures 5A, 5B, 5C:
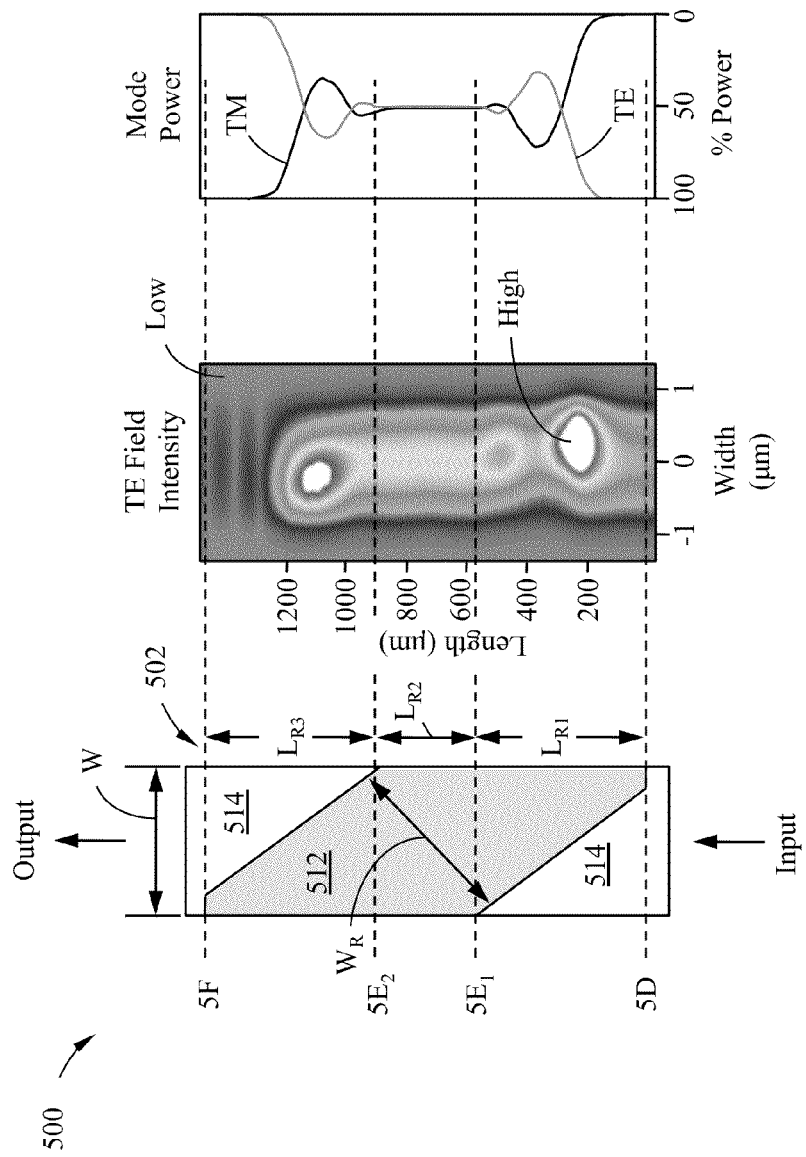
FIG. 5A depicts still another exemplary embodiment of a polarization rotator, in accordance with various aspects of the present disclosure.
FIG. 5B depicts a field intensity simulation of the response of the polarization rotator of FIG. 5A.
FIG. 5C depicts a mode power simulation of the response of the polarization rotator of FIG. 5A.
Figure 5E:
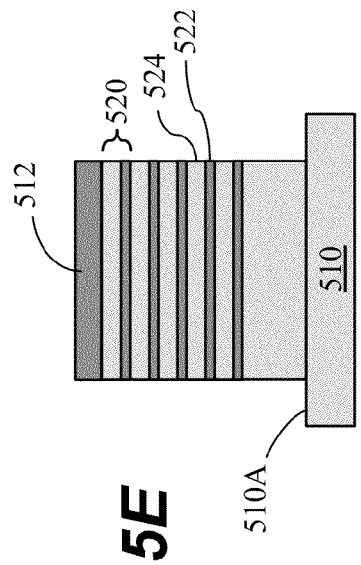
FIG. 5E depicts a second cross section view at a second point along the length of the polarization rotator of FIG. 5A.
Figure 5D:
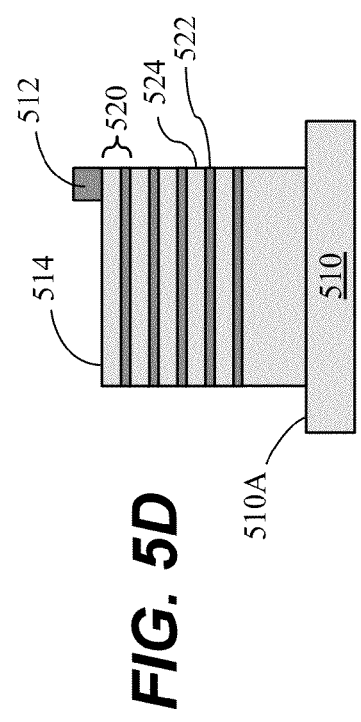
FIG. 5D depicts a first cross section view at a first point along a length of the polarization rotator of FIG. 5A.
Figure 5F:
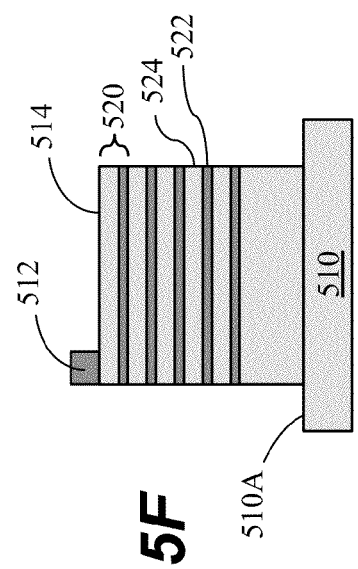
FIG. 5F depicts a third cross section view at a third point along the length of the polarization rotator of FIG. 5A.

FIGS. 5B and 5C depict a simulation of the TE field intensity, and TE and TM mode power, along the length $L_R$, e.g. $L_R = L_{R1} + L_{R2} + L_{R3}$, of the rotator 500 of FIG. 5A, respectively. The width W of the waveguide 502 may be selected to be 1.8 μm, while the raised portion 512 may be configured during fabrication to have a width $W_R$ of about 2.5 μm and a length $L_R$ of about 1600 μm. For this example, various waveguide cross sections at lines 5D-5G of FIG. 4A are depicted in FIGS. 5D-5G, respectively, the cross section depicted in FIG. 5E representative of the cross section at lines $5_{E1}$ and $5_{E2}$. During simulation, an optical signal having a TE mode is provided to the rotator 500 at an input, while the power in both the TE and TM polarization states is monitored along the length $L_R$ of the rotator 500. As the optical signal propagates from the input to an output of the rotator 500, the TE field intensity along the length of the rotator 500 as depicted in FIG. 5B transitions from a high intensity to a low intensity, confirming rotation of the polarization mode. The width of the TE field intensity graph is oriented such that a value of width=0 is aligned with a longitudinal axis of the rotator 500. Each adjacent shaded region depicted in FIG. 5B, for example between a first shaded region of high intensity (High) to a second shaded region of low intensity (Low), represents a step increment in declining intensity of the TE field. Referring to FIG. 5C, the mode power along the length of the rotator 500 is depicted. For example, at the input of the rotator 500 the TE mode power, as measured parallel to the substrate and near the top of the waveguide 502 for example, of the propagating optical signal is about 100%, and decreases to about 0% at the output of the rotator 500. Alternatively, the TM mode power of the propagating optical signal is about 0% at the input to the rotator 500 and increases to about 100% at the output of the rotator 500. Consistent with FIGS. 5B and 5C, polarization rotation is occurring over the portions of the rotator 500 along lengths $L_{R1}$ and $L_{R3}$. At the output of the rotator 500 at the length $L_R$, almost all the power in the TE mode has been converted into the TM mode.

Although the exemplary rotators of FIGS. 3-5 are shown having slashes or raised portions in the form of parallelograms, other geometric shapes are contemplated within the scope of this disclosure.

Figure 6:
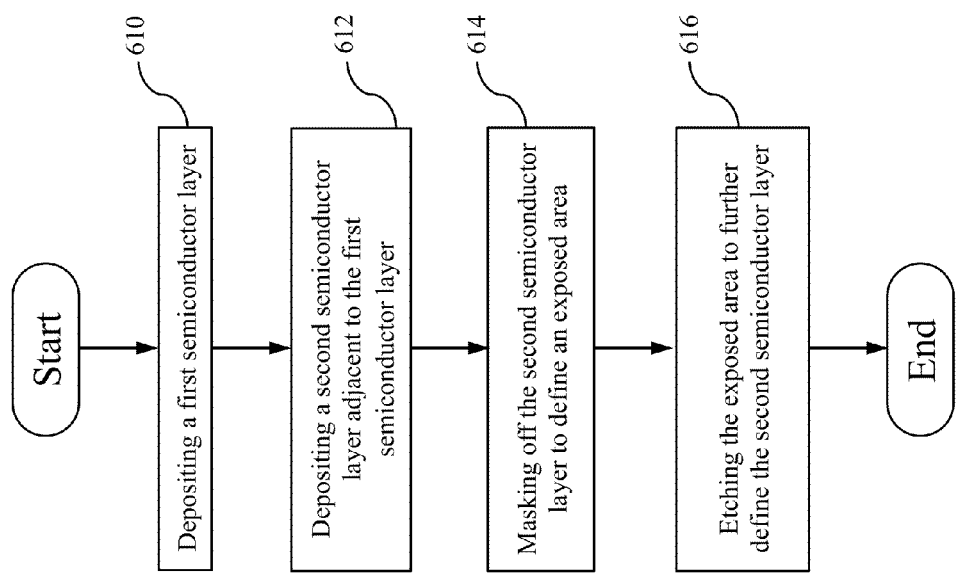
FIG. 6 depicts a method of fabricating an exemplary embodiment of a polarization rotator, in accordance with various aspects of the present disclosure.

Turning to FIG. 6, an exemplary method 600 for fabricating a waveguide to perform as a polarization converter or rotator consistent with this disclosure will be discussed in greater detail. In a first step 610 a first semiconductor layer is deposited. The first semiconductor layer may be deposited upon a substrate or other semiconductor layers. A second semiconductor layer is deposited adjacent to the first semiconductor layer in a step 612. The first and second semiconductor layers may be constructed of a material selected from a group consisting of silicon, silicon nitride, silicon oxynitride, silicon oxycarbide, germanium doped silica, indium phosphide, gallium arsenide, high index polymers, and combinations thereof. A portion of the second semiconductor layer is masked off in a step 614 to define an exposed area on the second semiconductor layer. The exposed area could be configured such that a subsequent etching may result in a raised portion, such as raised portion 512 of rotator 500 of FIGS. 5A-5F. Alternatively, the exposed area could be configured such that a subsequent etching results in a recessed portion with respect to the first semiconductor layer, the recessed portion inducing polarization rotation in the polarization converter or rotator. The exposed area is then etched in a step 616 to further define the second semiconductor layer, in accordance with the present disclosure. A layer of cladding material may be deposited over the waveguide if desired. The cladding material may be constructed of material selected for a group consisting of silica, lower index silicon oxynitride, lower index silicon oxycarbide, indium gallium arsenide phosphide, polymers, and combinations thereof.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:
1. A waveguide, comprising:
   a first semiconductor layer having a width and a length, first and second sides of the first semiconductor layer defining the width of the semiconductor layer; and
   a second semiconductor layer disposed adjacent to the first semiconductor layer, the second semiconductor layer having first and second sides each extending from the first side of the first semiconductor layer to the second side of the semiconductor layer, a first distance extending perpendicularly from the first side of the first semiconductor layer to the first side of the second semiconductor layer increasing along a first portion of the length of the first semiconductor layer, a second distance extending perpendicularly from the first side of the first semiconductor layer to the second side of the second semiconductor layer increasing along a second portion of the length of the first semiconductor layer, wherein the waveguide includes an input and an output, the waveguide is configured to receive light at the input, the waveguide inducing rotation of a polarization of the light from a first polarization state to a second polarization state as the light propagates along the length of the first semiconductor layer adjacent to the second semiconductor layer.

2. The waveguide of claim 1, wherein the first polarization state is one of a TE polarization state or a TM polarization state, and the second polarization state is the remaining one of the TE polarization state or the TM polarization state.

3. The waveguide of claim 1, wherein an electric field associated with the first polarization state has a first intensity at the input and a second intensity at the output, the first intensity being higher than the second intensity.

4. The waveguide of claim 1, wherein the first and second sides of the second semiconductor layer are substantially parallel.

5. The waveguide of claim 1, wherein the first and second sides of the second semiconductor layer are not parallel.

6. The waveguide of claim 4, wherein a line perpendicularly extending from the first side of the second semiconductor layer to the second side of the second semiconductor layer defines a width of the second semiconductor layer, the width being substantially constant along at least a portion of a length of the second semiconductor layer.

7. The waveguide of claim 6, wherein the width of the second semiconductor layer is less than the width of the first semiconductor layer.

8. The waveguide of claim 6, wherein the width of the second semiconductor layer is greater than the width of the first semiconductor layer.

9. The waveguide of claim 1, further comprising a substrate, the first and second semiconductor layers being provided on the substrate.

10. The waveguide of claim 9, wherein a first distance from the substrate to the first semiconductor layer is less than a second distance from the substrate to the second semiconductor layer.

11. The waveguide of claim 9, wherein a first distance from the substrate to the first semiconductor layer is greater than a second distance from the substrate to the second semiconductor layer.

12. A waveguide having a width and a length, and first and second sides, the first and second sides defining the width of the waveguide, the waveguide comprising:
a substrate; and
a semiconductor layer disposed on the substrate, a first portion of the semiconductor layer spaced from a second portion of the semiconductor layer along a portion of the length of the waveguide, each of the first and second portions of the semiconductor layer including a side which extends from the first side of the waveguide to the second side of the waveguide, a first distance extending perpendicularly from the first side of the waveguide to the side of the first portion of the semiconductor layer increasing along a first portion of the length waveguide, a second distance extending perpendicularly from the first side of the waveguide to the side of the second portion of the semiconductor layer increasing along a second portion of the length of the waveguide, wherein the wavequide includes an input and an output, the wavequide is configured to receive light at the input, the wavequide inducing rotation of a polarization of the light from a first polarization state to a second polarization state as the light propagates along the length of the semiconductor layer.

13. The waveguide of claim 12, wherein the first polarization state is one of a TE polarization state or a TM polarization state, and the second polarization state is the remaining one of the TE polarization state or the TM polarization state.

14. The waveguide of claim 12, wherein the side of the first portion of the semiconductor layer is substantially parallel to the side of the second portion of the semiconductor layer.

15. The waveguide of claim 13, wherein a line perpendicularly extending from the side of the first portion of the semiconductor layer to the side of the second portion of the semiconductor layer defines a distance, the distance being substantially constant along a portion of a length of the waveguide.

16. The waveguide of claim 15, wherein the distance is less than the width of the waveguide.

17. The waveguide of claim 15, wherein the distance is greater than the width of the waveguide.

18. A method of making a waveguide, comprising:
depositing a first semiconductor layer having a width and a length, first and second sides of the first semiconductor layer defining the width of the semiconductor layer;
depositing a second semiconductor layer adjacent the first semiconductor;
masking off the second semiconductor layer to define an exposed area on the second semiconductor layer;
etching the exposed area to further define the second semiconductor layer, the second semiconductor layer having first and second sides each extending from the first side of the first semiconductor layer to the second side of the semiconductor layer, a first distance extending perpendicularly from the first side of the first semiconductor layer to the first side of the second semiconductor layer increasing along a first portion of the length of the first semiconductor layer, a second distance extending perpendicularly from the first side of the first semiconductor layer to the second side of the second semiconductor layer increasing along a second portion of the length of the first semiconductor layer.

19. The method of claim 18, further comprising the step of disposing a layer of cladding material over the first and second semiconductor layers.

20. The method of claim 19, wherein the cladding material is constructed of a material selected from a group consisting of silica, lower index silicon oxynitride, lower index silicon oxycarbide, indium gallium arsenide phosphide, polymers, and combinations thereof.

21. The method of claim 18, wherein each of the first and second semiconductor layers is constructed of a material selected from a group consisting of silicon, silicon nitride, silicon oxynitride, silicon oxycarbide, germanium doped silica, indium phosphide, gallium arsenide, high index polymers, and combinations thereof.

* * * * *